Figure 1:
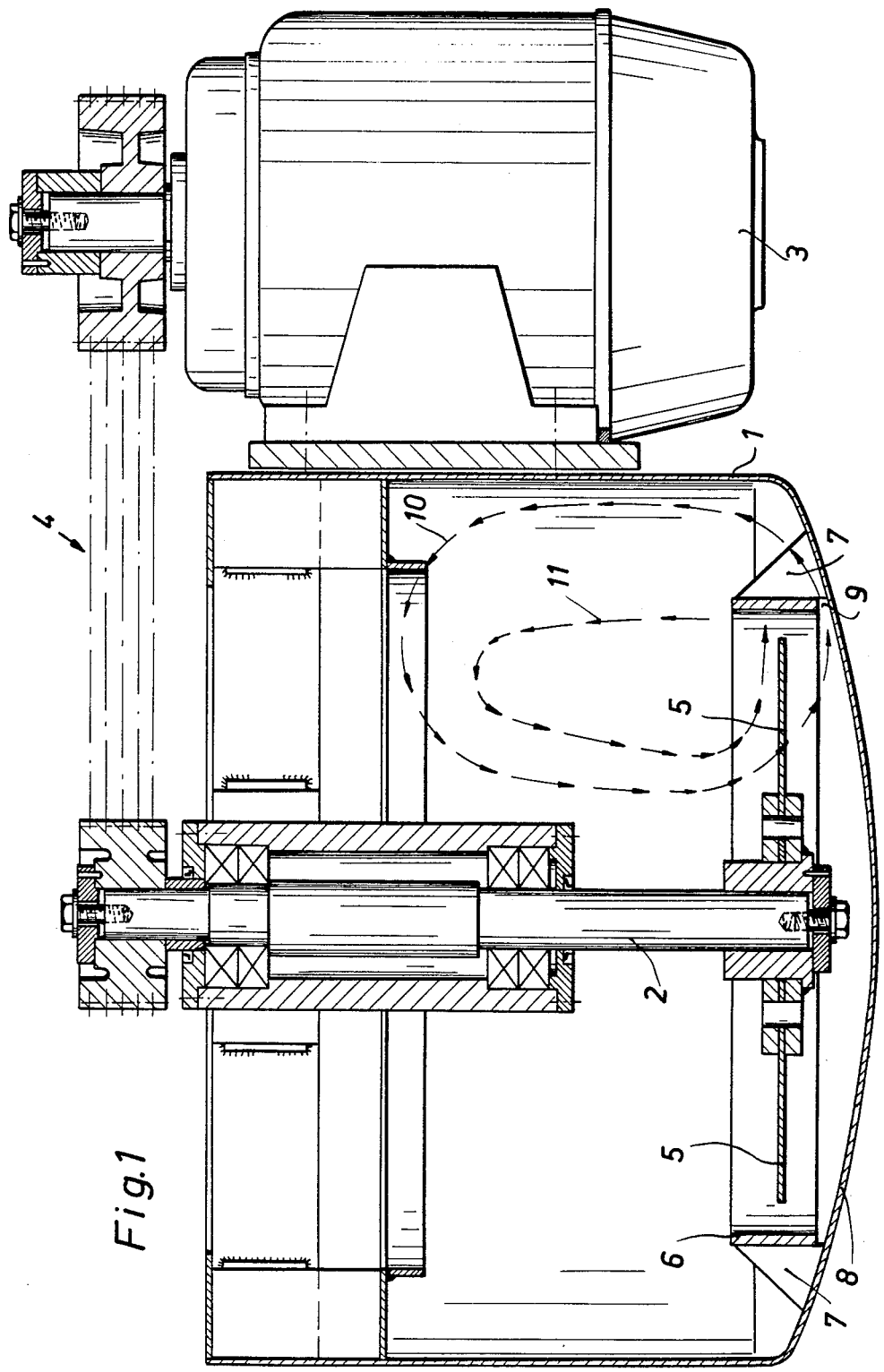

106-89　　　AU 113　　EX
7/28/81　　OR　4,280,847

United States Patent [19]
Hacheney

[11] 4,280,847
[45] Jul. 28, 1981

[54] PROCESS AND APPARATUS FOR PRODUCING HIGHLY COLLOIDIZED WATER-CEMENT MIXTURES AND FOR COATING PIPES

[76] Inventor: Wilfried Hacheney, am Königsberg 15, 4930 Detmold, Fed. Rep. of Germany

[21] Appl. No.: 898,894

[22] Filed: Apr. 21, 1978

[30] Foreign Application Priority Data

Apr. 23, 1977 [DE] Fed. Rep. of Germany ....... 2718236
Oct. 13, 1977 [DE] Fed. Rep. of Germany ....... 2746053
Dec. 7, 1977 [DE] Fed. Rep. of Germany ....... 2754424

[51] Int. Cl.$^3$ ............................................. C04B 7/02
[52] U.S. Cl. ........................................ 106/89; 427/183
[58] Field of Search ..................... 106/89, 97, 98; 138/145, 177; 427/183, 231, 233, 234

[56] References Cited

U.S. PATENT DOCUMENTS

| 3,357,851 | 12/1967 | Montgomery | 427/234 |
| 3,389,003 | 6/1968 | Gado | 106/98 |
| 3,669,700 | 6/1972 | Beach et al. | 106/98 |

FOREIGN PATENT DOCUMENTS 283916　1/1966　Australia .................. 427/231

*Primary Examiner*—James Poer
*Attorney, Agent, or Firm*—Michael J. Striker

[57] ABSTRACT

The invention relates to a process and apparatus for producing highly colloidized water-cement mixtures and to a process of coating structural members therewith.

8 Claims, 5 Drawing Figures

PROCESS AND APPARATUS FOR PRODUCING HIGHLY COLLOIDIZED WATER-CEMENT MIXTURES AND FOR COATING PIPES

The invention relates to a process and apparatus for producing highly colloidized water-cement mixtures and for coating pipes.

The effect of increased mixing speeds in the production of water-cement mixtures, tending to improve the physical and mechanical properties thereof, is in principle known.

The cause of an increase in the compression and bending tensile strength of the finished product, the cement block or the concrete, lies in the fact that, because of the friction and shearing forces which are dependent on speed, the individual grains of cement are subject to improved wetting and come into closer contact with the water for the hydration reactions which are to occur. However, the maximum hydration effect has not been achieved in the known processes. The increase in strength in the final product was only about 20% in comparison with a material produced by a normal mixing operation. This result is to be considered as evidence that it was not approximately a complete colloidization effect which was achieved, but only improved mixing of the two substances water and cement with each other.

The invention is based on the problem of developing a process for producing highly colloidized water-cement mixtures, which can be carried out with structurally simple means and in which a cement glue which is of high quality for further processing can be produced.

According to the invention, this problem is solved in that water and cement are pre-mixed in a mixer in a weight ratio of from 0.25 to 0.6 over a period of time of about 2 minutes at a speed of 300 m/min, then the water-cement mixture is rotated in the same or in a second mixer in such a way that the cement grains are exposed to a mass acceleration of at least 2 g (g=9.81 m/sec$^2$) over a period of time of at least 8 minutes and the mixture is thereby converted to a completely colloidized cement glue, and said cement glue is then used for manufacturing structural members, for partially or completely coating the inside and/or outside of structural members or for filling gaps.

In the process according to the invention, the actual colloidization step is preceded by a pre-mixing operation in which the components water and cement are put into the state of a suspension, at a speed of about 300 m/min.

The conditions which it is absolutely necessary to observe in the colloidization operation also include the correct ratio between the amounts of water and cement, which ratio arises out of the degree of saturation which ensures complete hydration. This therefore determines the upper and lower limits in respect of the addition of water, namely by a water-cement factor of from 0.25 to 0.60, depending on the particular chemical and physical nature of the respective kind of cement used.

An excessively small amount of water would result in a decline in the strength properties, such as the compression and bending tensile strengths. An excessive amount of water, as a result of the pores and water forming an intermediate layer, would result in the same effect and would also detrimentally affect the shrinkage process.

If the stated mixing conditions as regards speed, acceleration of the grains of cement, exposure time and water-cement factor are observed, the compression strength values can be increased by 300% and the bending tensile strength values can even be increased by 400%, in comparison with a final product produced in a normal mixing process. In practice, with complete colloidization, and with the stated ratios between the amounts of the components being observed, it is possible to achieve compression strengths of 2000 kp/cm$^2$ and bending tensile strengths of 250 kp/cm$^2$.

Because of its mechanical and physical nature, the cement block produced by the process according to the invention is suitable for the protection of structural components of steel and iron, non-ferrous metals and plastics materials, in many different ways. By virtue of its high compression and bending tensile strengths and its shrinkage and porosity which tend towards zero, it can likewise be used for the surface protection against chemical and mechanical attack. The colloidal cement glue is therefore used in the surface treatment of steel pipes, cast pipes, plastics pipes and general structural members of these above-stated materials. Because the cement glue has a high degree of resistance in respect of acid and alkali agents, it can provide a highly effective surface protection. The passive protection action is of such a high degree of efficiency because the applied layer is virtually free from pores, cracks, or shrinkage cavities.

The hitherto usual method of protecting surfaces, for example of cast and steel pipes, in the drinking-water supply system, is incomparably inferior in its effect, as cracks and pores are inevitable in conventionally produced claddings, because of the shrinkage phenomena and evaporation phenomena of the pore water. Account should be taken of the fact that the so-called active corrosion protection of the cement only occurs to a limited degree.

Because of the homogeneity of the colloidal cement glue or cement block produced by the process of the invention, the adhesion strength of the cement glue or cement block is considerably greater than that of mortar produced in a conventional manner.

In accordance with an advantageous embodiment of the invention, reinforcement materials of up to 10% by weight, which in particular can increase the bending tensile strength by a multiple, are added to the completely colloidized cement glue produced by the process of the invention, during or directly subsequent to the application thereof to a structural member. Such reinforcement materials are organic or inorganic fibres which are uniformly bound into the entire cross-section. With this process, bending tensile strength values of up to 600 kp/cm$^2$ are attained. The above-described advantages of the freedom from pores and cracks are fully maintained with the addition of these reinforcement materials, so that the structural member in the reinforced state does not suffer from a reduced corrosion-chemical resistance.

In order to improve the strength properties and the corrosion resistance of the cement-water colloid, albumin substances or substances with a high silica content can be added to the water-cement mixture, in a liquid or solid form.

The strength properties, in particular the bending and tensile strengths of colloidal cement-water glues can be modified by the addition of albumin substances in very widely varying forms. The albumin substances can be added to the cement-water mixture before the colloidization step either in a liquid form or in the form of mineralized albumin substances, for example in the form of milkstone. Even the addition of small amounts of albumin results in a considerable increase in the strength of the colloidized cement glue.

Only from 0.01 g/kg cement to 5% by weight needs to be added to the water-cement mixture before the colloidization operation. The 5% by weight represents the upper limit. If larger amounts of albumin substances are added, there is a reduction in strength in the final product, without however the corrosion resistance of the cement glue being detrimentally affected. The addition of albumin substances also increases the corrosion resistance of the colloidized cement glue. This applies not only for direct acid attacks. After a maturing time of at least six weeks, the cement glue also enjoys considerable corrosion-resistant properties in respect of basic attack.

Adding to the cement-water mixture, before the colloidization step, substances with a high silica content, in liquid or solid form, provides an improvement in the corrosion resistance of the cement-water colloid. The lower limit in respect of the amount of substances with a high silica content, which are to be added, is 0.01 g/kg cement. The upper limit is about 20% by weight.

If the silica substance is added in a liquid condition, for example in the form of water glass, the final product suffers from a substantial fall in strength, above 7%. The optimum amount to be added is from 1 to 5%.

In the case of solid silica substances to be added, for example water glass which is dried and subsequently ground, the amount to be added can be raised to 20%.

In order to avoid pore-forming air and gas inclusions in the final product, it is advantageous for the mixing chamber to be evacuated before the components are mixed, and to be kept under a reduced pressure during the mixing operation.

It has been found advantageous to have a reduced pressure of from 2 to 4 mg/Hg head in the mixing chamber.

Figures 2, 3:
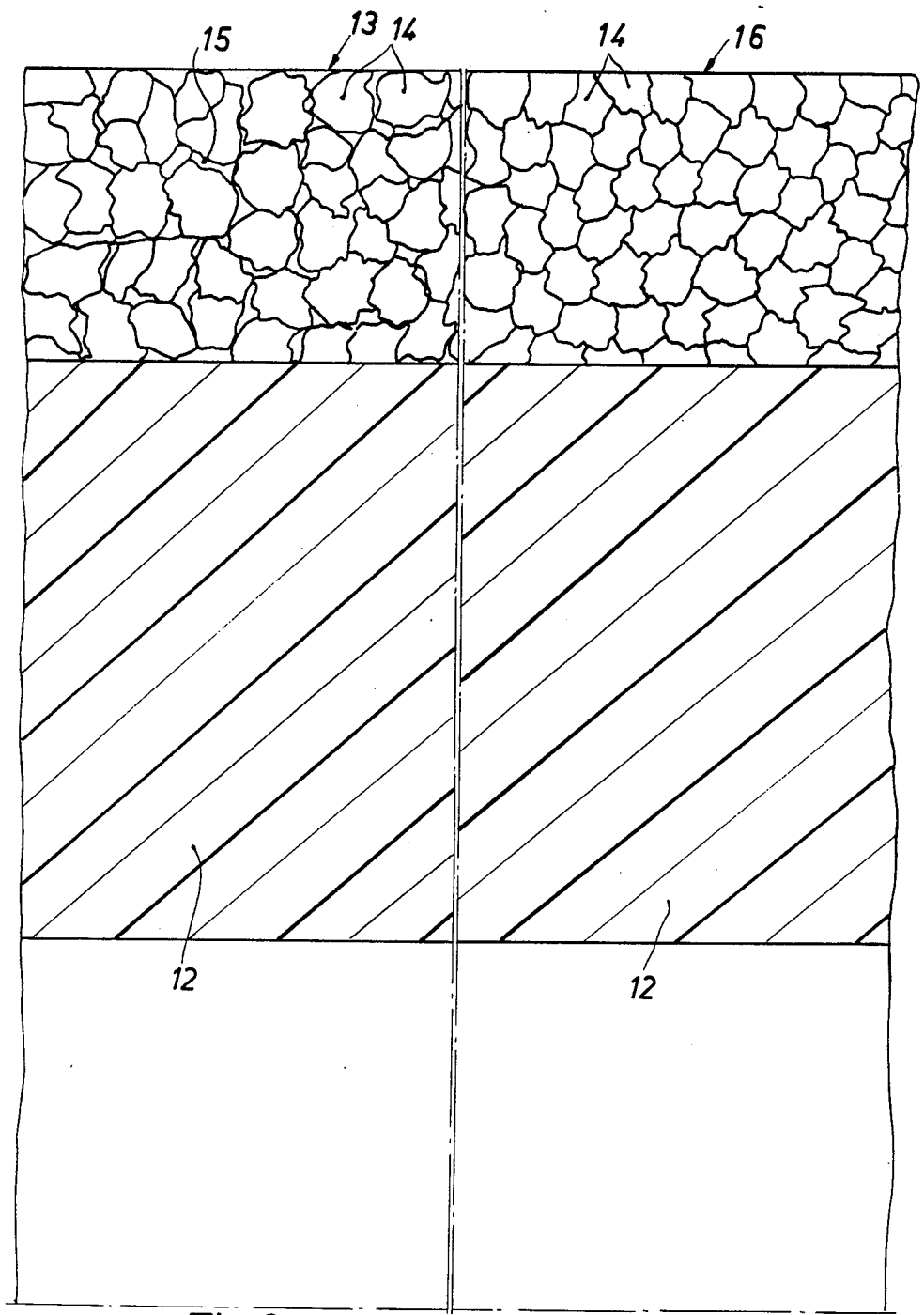
Figure 4:
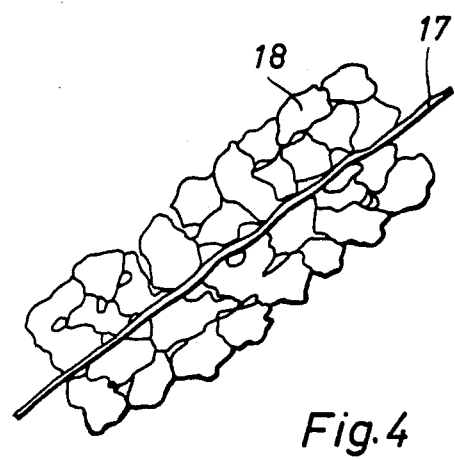
Figure 5:
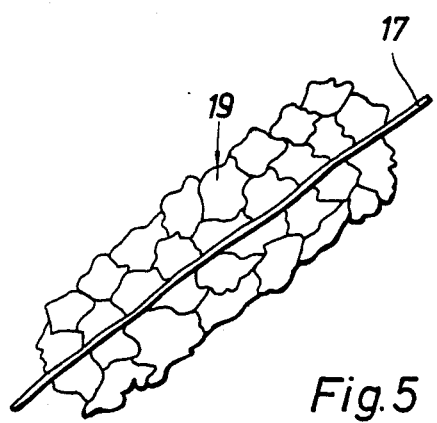

An embodiment of the mixer and examples of use of the colloidized cement glue are described hereinafter and illustrated in the drawings, in which:

FIG. 1 shows a view of the mixer in vertical section,

FIG. 2 shows a view in cross-section of a pipe casing which is coated with cement mortar produced by the known mixing process, FIG. 3 shows a sectional view of a pipe casing on which the outer coating comprises a colloidized cement mortar according to the invention, FIG. 4 shows a glass fiber which is embedded in a cement mortar produced in accordance with the known mixing process, and FIG. 5 shows a glass fiber which is embedded in a colloidized cement mortar according to the invention.

The mixer for mixing the water-cement mixture has a container 1 in which a vertical shaft 2 is rotatably mounted. The shaft 2 is driven by means of an electric motor 3 and a transmission assembly 4. At least two diametrically opposed mixing blades 5 are secured to the shaft 2 at the lower free end thereof, the mixing blades being inclined at an angle of from 5° to 10° relative to the horizontal. These mixing blades are surrounded by a baffle ring 6 which is arranged at a spacing from the mixing blades and concentrically relative thereto, and which can be from 100 to 200 mm in height.

The baffle ring is secured to the bottom 8 of the mixing container by means of mounting brackets 7, the lower edge of the baffle ring being arranged at a maximum spacing of 200 mm from the bottom 8. This fixes an annular gap 8 between the baffle ring 6 and the bottom 8 of the mixer, so that the material being mixed can flow around the baffle ring in the direction of the outer circulation circuit 10, during the mixing phase. The outer circulation circuit 10 is denoted by arrows in FIG. 1. The co-operation between the mixing blades 5 and the baffle ring 6 also causes the material being mixed to follow an inner circulation circuit 11, so that the mixing blades can be operative over their entire length and surface area. The required mass accelerations are achieved in the entire region of the mixing blades.

The height to which the container 1 is filled is related to the diameter of the container in a ratio which may not exceed a value of 2, as otherwise the volume of material filling the container is not subjected to the completely synchronous mixing action and the controllability of the mixing process is not ensured.

Because the ratios between the amounts of water and cement must necessarily be precisely observed for the colloidization process and because the mixing times in the preliminary step and the main step of the process must also be precisely observed for the same purpose, the mixer is provided with metering means on the one hand and with a time relay on the other hand. With the desired amount for filling the mixer being pre-selected, the agitator mechanism only starts operating when the proportions of cement and water are in the correct ratio relative to each other. After the mixing operation has been started, the pre-mixing and main mixing steps take place within the pre-selected exposure times.

After the mixing operation, a completely colloidized cement glue is drawn from the mixing container, and such cement glue can now be used for making shaped members, for coating the inside or outside of structural members (for example pipes) or structural components, or for closing gaps for the purposes of re-stabilisation.

FIGS. 2 and 3 show the differences between a pipe coated with a known cement mortar and a completely colloidized cement mortar produced by the process according to the invention.

In FIG. 2, the casing 12 of a plastics pipe is provided with a cement mortar coating 13 which is produced in accordance with a known mixing process. Between the individual grains of cement 14 are cavities 15 which can be of many different configurations and the formation of which depends on many chance factors.

FIG. 3 shows the casing 12 of the plastics pipe provided with a completely colloidized cement mortar layer 16 according to the invention. There are no cavities between the individual grains of cement 14, thus giving favourable adhesion forces. No evaporation of excess pore water occurs in the cement mortar coating according to the invention, during the setting process or subsequently thereto, under the influence of heat, so that there is no danger of the protective coating becoming loosened by the evaporation of pore water, in the subject of the invention.

FIG. 4 shows a glass fibre 17 which is enclosed by grains of cement 18 of a cement mortar which was mixed in accordance with a known process. Between the individual grains of cement are cavities which also occur in the region of the glass fibre.

The good flow properties of the colloidal cement glue result in complete wetting of the fibres 17, as shown in FIG. 5. The fibres 17 are therefore embedded in the cement glue 19, over their entire surface. This results in a composite component which is absolutely free from defects, thus providing high bending tensile strength values.

In connection with colloidized cement glue and fibre substances, the composite material can also be used in this way, in addition to the surface protection for corrosion resistance, for stabilising carrier members, for example plastics pipes, that is to say, for materials which on their own have insufficient mechanical properties. It will be understood that it is also possible to produce complete structural systems without a carrier material, for example plates or pipes.

Finally, the colloidal cement can be used in the most widely varying fields, because of its excellent creep properties for filling very narrow gaps and thus for re-stabilisation purposes.

In the process described above, water and cement components are mixed. It is also possible however for a proportion of the cement to be replaced by a mineral substance, in particular by a mineral substance with latent hydraulic properties or a mixture of substances. If up to 10% of the cement is replaced by a mineral substance of this kind, it is possible to produce a final product with the same strength properties, as those of the mixture described above. The production costs of this final product are however lower.

Pipes of PVC and polyethylene are most frequently taken into consideration, in the field of manufacture and use of plastics pipes.

If such pipes are encased with a colloidized cement glue which can be reinforced or non-reinforced, the pipe enjoys a firm enclosing layer. This surface coating enjoys particularly strong adhesion to the surface of the pipes, so that there is a sufficient degree of static friction which is able to carry for example the contraction stresses of the plastics material, by means of the static friction. This is of particular importance in the case of smooth extruded pipes, for even slight temperature fluctuations can produce considerable linear expansion differences, for example, by virtue of the expansion which depends on the above-mentioned temperature fluctuations.

The sheathing can be adapted in respect of its dimensions to any loading condition. By making the dimensions with a suitable safety margin, it is possible for all loading conditions to be forestalled, thus avoiding the uncertainty which occurs when using plastics material alone.

The casing or the protective layer can be applied by means of different forms of apparatus.

The plastics pipe to be coated is set precisely in position by inserting a centering sleeve. The ends of the pipe can also be closed off by means of caps. Compressed air or pressure fluid is introduced into the interior of the pipe so as to provide the pipe with a support means, and the pipe is then clamped in a rotary frame for sheathing the pipe with the colloidized cement-water mixture. The pipe which rotates in the rotary frame is coated with the colloidized cement glue by means of spray devices. After the pipe has been coated in this way, the pipe is set down in support frames or support ways for a period of from 8 to 12 hours.

A mandrel or other holding means can also be inserted into the interior of the pipe, to form the pipe support means.

It is also possible for the pipe, after it has been centered, to be introduced into a rolling device, and for the corresponding casing coating of colloidized cement glue to be applied by a gravity rolling action or a rotary rolling action. A very high degree of compacting of the material is achieved by this rolling operation. The air inclusions which occur during transportation and coating are almost completely removed so that the material which was originally highly compact is also applied in an extremely compact form as the outer casing.

It is also possible for the coating operation to be performed by a combination of spraying and rolling. In such a case, either the material is first sprayed on and then rolled, or the material is sprayed on to the pipe body in suitable regions in pre-selected amounts on the way to feeding the rolling apparatus during the rolling operation.

It is also possible for the pipe, provided with an internal support means, to be disposed centrally in a pressing bowl member, for the pressing bowl member to be filled with colloidized cement-water mixture, for the cement-water mixture to be pressed on to the pipe under a preselected pressure by way of the pressing bowl member, and for the pressure force to be maintained during the setting time.

After the coating operation, the coated pipes must be subjected to a hardening time, in which respect it is advantageous to observe certain limits in respect of moisture and ambient atmosphere.

The plastics pipes can be reduced in respect of their wall thickness to the extent which the production process permits this, as the loadings are substantially carried by the casing. Reducing the plastics pipe wall thickness ensures a high degree of economy in respect of the plastics colloid cement composite pipe. This is found particularly in the case of pipes of larger nominal diameters. The composite pipe can be fitted into and on to all previously used waste water pipes and conduit systems, by suitable calibration and by using a standard connecting socket. A separate fitting depot is not necessary. Components which were used hitherto can continue to be used. Use on building sites is found to be very simple due to the possibility of calibration of the composite pipe, as any outside diameter in the respective range of dimensions can be produced on the pipe by using conventional calibration equipment.

The plastics pipes to be coated can also be wound from an extruded band. Plastics pipes of this kind are particularly suitable in the larger sizes, for producing colloid cement composite pipes, as in this case plastics can be saved in a particularly suitable form, and particularly good strength values are achieved by the intensive connection between the casing material and the plastics pipe material.

I claim:

1. A process for forming protective coatings for structural components, comprising premixing water and cement in a mixer in a weight ratio between about 0.25 and 0.6 for about 2 minutes at a speed of 300 m/min; rotating said water-cement mixture in the same or in a second mixer so that cement grains in said mixture are exposed to a mass acceleration of at least 2 g (g=9.81 m/sec$^2$) over at least 8 minutes, thereby forming a completely colloidized cement glue; applying said cement glue to a structural component to be coated; and allowing said coating to set for about 8 to 12 hours.

2. A process as defined in claim 1, wherein said applying is effected through spray means.

3. A process as defined in claim 1, wherein said applying is effected through a gravity or rotary rolling operation.

4. A process as defined in claim 1, wherein said structural component is a pipe.

5. A process as defined in claim 4, wherein said pipe is mounted for rotary movement about its longitudinal axis prior to said application of said cement glue.

6. A process as defined in claim 4, wherein said pipe is closed off at its ends by means of caps, provided with a support means by compressed air or pressure fluid introduced into the interior of the pipe, and then clamped in a rotary frame prior to said applying of said cement glue.

7. A process as defined in claim 4, wherein said pipe is provided with a mandrel, calibration sleeve or other internal support means prior to said applying of said cement glue.

8. A process as defined in claim 4, wherein said pipe is provided with an internal support means, positioned centrally in a pressing bowl member, said pressing bowl member is filled with said cement glue, and said cement glue is pressed onto said pipe under a preselected pressure by means of said pressing bowl member, which pressing force is maintained during the setting time.

* * * * *